United States Patent
Yamada

(10) Patent No.: US 8,964,215 B2
(45) Date of Patent: Feb. 24, 2015

(54) DEVICE CONTROL PROGRAM, DEVICE CONTROL METHOD, AND PRINTER CONTROL DEVICE

(75) Inventor: Kazutaka Yamada, Aichi-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 649 days.

(21) Appl. No.: 13/231,385

(22) Filed: Sep. 13, 2011

(65) Prior Publication Data
US 2012/0081742 A1 Apr. 5, 2012

(30) Foreign Application Priority Data
Sep. 30, 2010 (JP) ................................. 2010-221245

(51) Int. Cl.
*G06F 15/00* (2006.01)
*G06F 3/12* (2006.01)

(52) U.S. Cl.
CPC ............ *G06F 3/1205* (2013.01); *G06F 3/1254* (2013.01); *G06F 3/1257* (2013.01); *G06F 3/1285* (2013.01); *G06F 3/1255* (2013.01)
USPC .......................................... 358/1.15; 358/1.9

(58) Field of Classification Search
CPC ... G06F 3/1201; G06F 3/1204; G06F 3/1205; G06F 3/1226; G06F 3/1253; G06F 3/1257; G06F 3/1276
USPC ....................................................... 358/1.15
See application file for complete search history.

(56) References Cited

U.S. PATENT DOCUMENTS

| | | | | |
|---|---|---|---|---|
| 6,563,519 | B1 * | 5/2003 | Minagawa | 715/764 |
| 7,145,688 | B2 * | 12/2006 | Minagawa | 358/1.2 |
| 7,307,742 | B2 * | 12/2007 | Noda | 358/1.13 |
| 2004/0085563 | A1 | 5/2004 | Nishimura | |
| 2005/0012949 | A1 | 1/2005 | Kitahara et al. | |
| 2006/0028668 | A1 | 2/2006 | Kumashio | |
| 2007/0177179 | A1 | 8/2007 | Takatsu | |

FOREIGN PATENT DOCUMENTS

| | | |
|---|---|---|
| JP | H09-254484 A | 9/1997 |
| JP | H11-221946 A | 8/1999 |
| JP | 2003-316538 A | 11/2003 |

(Continued)

OTHER PUBLICATIONS

Japan Patent Office, Decision to Grant a Patent for Japanese Patent Application No. 2010-221245 (counterpart Japanese patent application), mailed Jan. 15, 2013.

*Primary Examiner* — Quang N Vo
*Assistant Examiner* — Mark Milia
(74) *Attorney, Agent, or Firm* — Baker Botts L.L.P.

(57) ABSTRACT

A non-transitory, computer-readable medium storing a device control program including instructions for controlling a device based on setting values assigned to each setting item received from an application program, the instructions including the steps of: retrieving at least one setting value batch including data that specifies values for each setting item, wherein each setting item corresponds to an operation of the device; generating a list of values for at least one of the setting items, the list of values including at least one setting value and the at least one setting value batch; receiving a request for the list of values from the application program; upon receipt of the request, providing the list of values to the application program; and receiving a selection of one of the at least one setting value batch from the application program.

20 Claims, 13 Drawing Sheets

(56) References Cited

FOREIGN PATENT DOCUMENTS

| JP | 2004-348486 A | 12/2004 |
| JP | 2006-048296 A | 2/2006 |
| JP | 2007-206828 A | 8/2007 |
| JP | 2008-310495 A | 12/2008 |

* cited by examiner

Fig.2

| ID | SETTING NAME | SHEET SIZE | SHEET TRAY | THE NUMBER OF COLORS | IMAGE QUALITY | DUPLEX PRINTING | THE NUMBER OF PRINT PAGES ON SINGLE SIDE |
|---|---|---|---|---|---|---|---|
| 1001 | ECONOMY PRINTING_TRAY 1 | A4 | TRAY 1 | MONOCHROME | LOW IMAGE QUALITY | SINGLE SIDED | TWO |
| 1002 | ECONOMY PRINTING_TRAY 2 | A4 | TRAY 2 | MONOCHROME | LOW IMAGE QUALITY | SINGLE SIDED | TWO |
| 1003 | DUPLEX PRINTING_TRAY 1 | Letter | TRAY 1 | COLOR | HIGH IMAGE QUALITY | DOUBLE SIDED | ONE |
| 1004 | DUPLEX PRINTING_TRAY 2 | Letter | TRAY 2 | COLOR | HIGH IMAGE QUALITY | DOUBLE SIDED | ONE |

Fig.4

| SHEET ID | SHEET NAME | SHEET SIZE |
|---|---|---|
| 9 | A4 | 210 X 297mm |
| 1 | Letter | 215.9 X 279.4mm |
| 11 | A5 | 148 X 216mm |
| 1001 | ECONOMY PRINTING_TRAY 1 | 210 X 297mm |
| 1004 | DUPLEX PRINTING_TRAY 2 | 215.9 X 279.4mm |

DEVICE CONTROL PROGRAM, DEVICE CONTROL METHOD, AND PRINTER CONTROL DEVICE

CROSS REFERENCE TO RELATED APPLICATION

This application claims priority from Japanese Patent Application No. 2010-221245 filed on Sep. 30, 2010. The entire content of this priority application is incorporated herein by reference.

TECHNICAL FIELD

The present invention relates to a technology to receive a specification of batch setting information and control a device on the basis of the specified batch setting information. The batch setting information is a combination of setting values set for each setting item in advance.

BACKGROUND

Computer apparatus are known, which use predetermined default settings to cause printers to print documents. Such computer apparatus are capable of changing the default settings in the following manner. In response to operations in which a user clicks a [File] button provided in a menu bar in an application window of an application program and, then, selects [Print], a [Print] dialog box is displayed. In response to the user's clicking of a [Property] button in the [Print] dialog box, a [Printer property] dialog box is displayed. The [Printer property] dialog box is displayed by a printer driver. Specifically, in response to the user's clicking of the [Property] button, the printer driver is invoked from the application program, and the [Printer property] dialog box is displayed by the invoked printer driver.

After changing a print setting in the displayed [Printer property] dialog box, the user clicks a [Register as default] button provided in the dialog box to reflect the content of change in the [Printer property] dialog box in the default settings.

SUMMARY

Nevertheless, according to the related art, the user invokes the printer driver to display the [Printer property] dialog box each time the default settings are to be changed. Accordingly, known methods and apparatus for changing default settings are unnecessarily complicated and are not user friendly.

In order to resolve the foregoing problem, the present invention provides a technology capable of facilitating in specification of batch setting information and improving user friendliness.

A non-transitory, computer-readable medium disclosed herein may store a device control program which may comprise instructions for controlling a device based on setting values assigned to each of a plurality of setting items received from an application program. The instructions may control the device to perform several steps. The non-transitory, computer-readable medium may comprise an instruction to perform a step of retrieving at least one setting value batch comprising data that specifies values for each setting item of the plurality of setting items, wherein each setting item of the plurality of setting items corresponds to an operation of the device. The non-transitory, computer-readable medium may comprise an instruction to perform a step of generating a list of values for at least one of the plurality of setting items, the list of values comprising at least one setting value and the at least one setting value batch. The non-transitory, computer-readable medium may comprise an instruction to perform a step of receiving a request for the list of values from the application program. The non-transitory, computer-readable medium may comprise an instruction to perform a step of upon receipt of the request, providing the list of values to the application program. The non-transitory, computer-readable medium may comprise an instruction to perform a step of receiving a selection of one of the at least one setting value batch from the application program.

A method of controlling a device based on setting values assigned to each of a plurality of setting items received from an application program disclosed herein may comprise steps for controlling the device. The method may comprise a step of retrieving at least one setting value batch comprising values for each of the plurality of setting items, wherein each setting item of the plurality of setting items corresponds to an operation of the device. The method may comprise a step of generating a list of values for at least one of the plurality of setting items, the list of values comprising at least one setting value and the at least one setting value batch. The method may comprise a step of receiving a request for the list of values from the application program. The method may comprise a step of providing the list of values to the application program upon receipt of the request. The method may comprise a step of receiving from the application program a selection of one of the at least one setting value batch.

A printer control device configured to control a printer based on setting values assigned to each of a plurality of setting items received from an application program disclosed herein may comprise a retrieving section; a generating section; a receiver; and a transmitter. The retrieving section may be configured to retrieve at least one setting value batch comprising values for each of the plurality of setting items, stored in a memory. The generating section may be configured to generate a list of values for at least one of the plurality of setting items, the list of values comprising at least one setting value and the at least one setting value batch. The receiver may be configured to receive a request for the list of values from the application program. The transmitter may be configured to, upon receipt of the request, transmit the list of values to the application program. Further, the receiver may be configured to receive from the application program a selection of one of the at least one setting value batch.

The present invention is realized in various embodiments including, but not limited to, a device control program, a printing program, a device control method, a printing method, and a recording medium recording the programs. Other objects, features and advantages are apparent to those skilled in the art from the following detailed description of the invention and the accompanying drawings.

BRIEF DESCRIPTION OF THE DRAWINGS

FIG. 2 is a table schematically depicting exemplary preset print settings.

FIG. 4 is a table schematically depicting an example of a list of setting values returned from a printer driver.

DETAILED DESCRIPTION OF EMBODIMENTS OF THE INVENTION

Embodiment of the present invention are described herein with reference to FIGS. 1-13.

(1) Configuration of Information Processing Apparatus.

Figure 1:
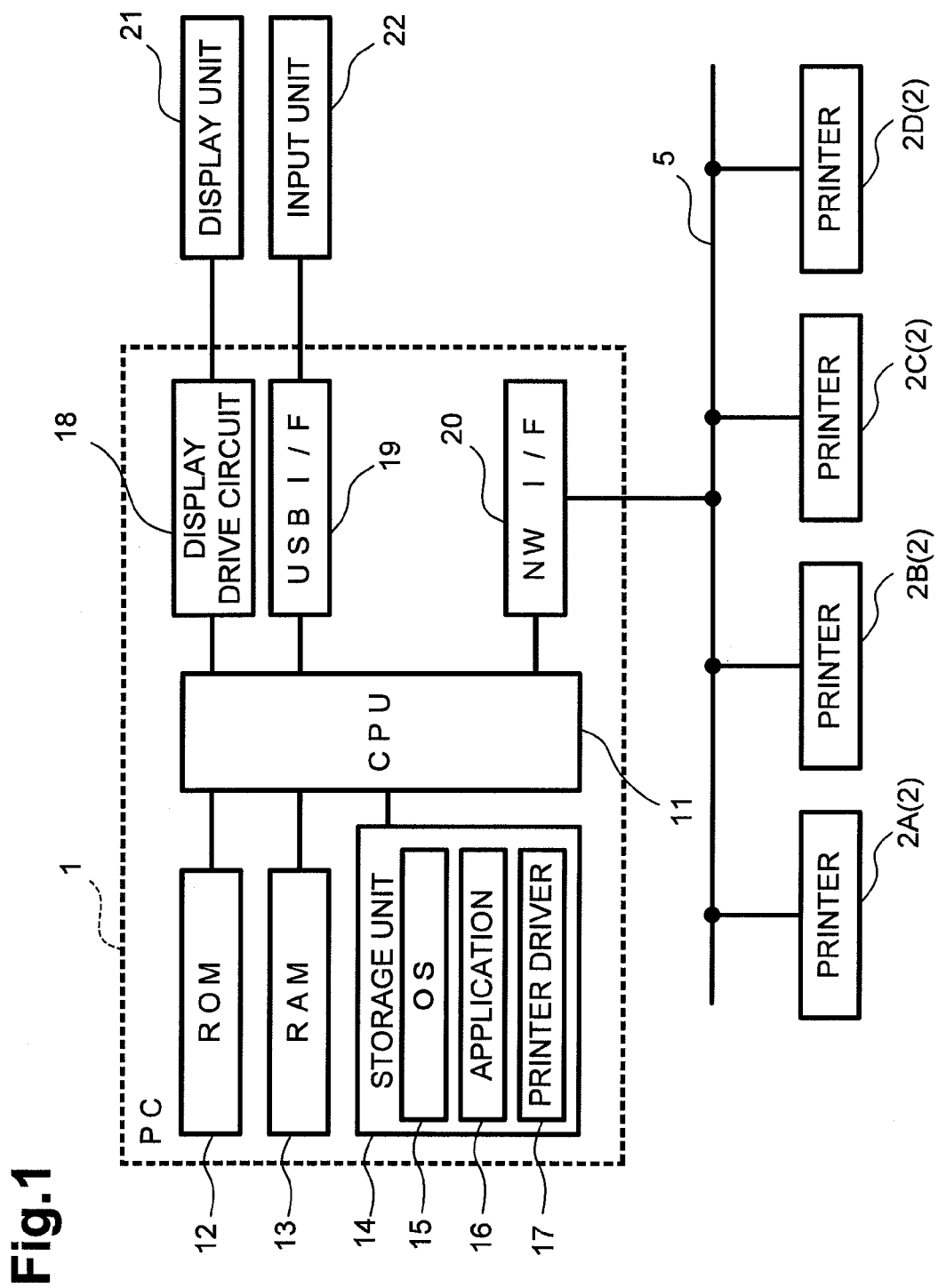
FIG. 1 is a block diagram schematically depicting an example of the configuration of a personal computer according to an embodiment of the present invention.

FIG. 1 is a block diagram schematically depicting an example of the configuration of a personal computer (PC) 1. Referring to FIG. 1, the personal computer 1 may comprise, for example, a central processing unit (CPU) 11, a read only memory (ROM) 12, a random access memory (RAM) 13, a storage unit 14, a display drive circuit 18, an universal serial bus (USB) interface (USB I/F) 19, and a network interface (NW I/F) 20.

The CPU 11 may execute various programs stored in the ROM 12 and the storage unit 14 to control each component of the PC 1. The ROM 12 may store therein the various programs executed by the CPU 11, data, and the like. The CPU 11 may use RAM 13 as a main memory to execute a variety of processing functions.

The storage unit 14 may comprise a hard disk or a non-volatile memory, such as a flash memory, to store the various programs and data. The storage unit 14 may store one or more of an operating system (OS) 15, application programs 16 (e.g., a word processor software, spreadsheet software, image editing software, and similar software), a printer driver program 17 (e.g., a device control program), and similar programs.

Microsoft® Windows® operating system, commercially available from Microsoft Corporation of Redmond, Wash., U.S.A., is exemplified as the OS 15 in a present embodiment of the invention. The OS 15, however, is not limited to Microsoft® Windows® operating system.

The display drive circuit 18 may drive a display unit 21, such as a cathode ray tube (CRT) or a liquid crystal display. The display drive circuit 18 may connect to the display unit 21 via a cable or other data connection.

The USB interface 19 may function as a USB host interface. An input unit 22 may comprise a keyboard or a mouse or similar graphic user interface input device, or both, and may connect to the USB interface 19.

The network interface 20 may connect to one or more printers 2 (e.g., a device) via a communication network 5, such as a local area network (LAN) or the Internet, to establish communication with the printers 2. At least one of printers 2 may be of the same type, or printers 2 may be of different types. A printer 2 may be, but is not limited to, one of printers 2A-2D in the following description.

(2) Print Condition

The CPU 11 may be configured to execute the printer driver program 17 (hereinafter referred to as a "printer driver 17") and may cause the PC 1 to execute a process of controlling the printer 2 based on a print condition (e.g., a setup condition) that comprises a combination of setting values set for each setting item in the printer 2.

The setting items may be items for which setting values determining the operation of the printer 2 may be set and may comprise, but are not limited to: a sheet size (e.g., A4 or Letter or A5), a sheet tray (e.g., Tray 1 or Tray 2), the number of colors (e.g., color or monochrome), an image quality (e.g., high resolution or low resolution), duplex printing (e.g., available or unavailable), and the number of print pages on a single side (e.g., one or two or four).

(3) Preset Print Setting

FIG. 2 is a table schematically depicting exemplary preset print settings. Setting values for each setting item may be set in advance and a combination of setting values may be registered as a preset print setting (e.g., batch setting information). A registered preset print setting may be specified to collectively set, as the print condition, the setting values of the preset print setting.

Multiple preset print settings may be set and a specific setting name (e.g., batch setting identification information) may be given to each preset print setting. Each preset print setting may be provided with a specific identifier (ID).

In the present embodiment, the preset print settings (e.g., Economy printing_Tray 1, Economy printing_Tray 2, Duplex printing_Tray 1, and Duplex printing_Tray 2) depicted in FIG. 2 may be registered. For example, the preset print settings may be registered on a print condition setup screen (not depicted) displayed by the printer driver 17. The registered preset print settings may have IDs (e.g., batch setting identification information) provided by the printer driver 17. The storage unit 14 may store the registered preset print settings therein. The print condition setup screen may be configured to receive a certain input operation (e.g., from a user) that specifies, from the registered preset print settings, a preset print setting to be used in printing.

(4) Display of Preset Print Setting in Application Program

The print condition setup screen may receive the certain input operation that specifies the preset print setting, as described above. In addition, the printer driver 17 may enable the CPU 11 to display the preset print settings on a page setup screen when executing the application programs 16 (hereinafter referred to as an "application 16").

Figure 3:
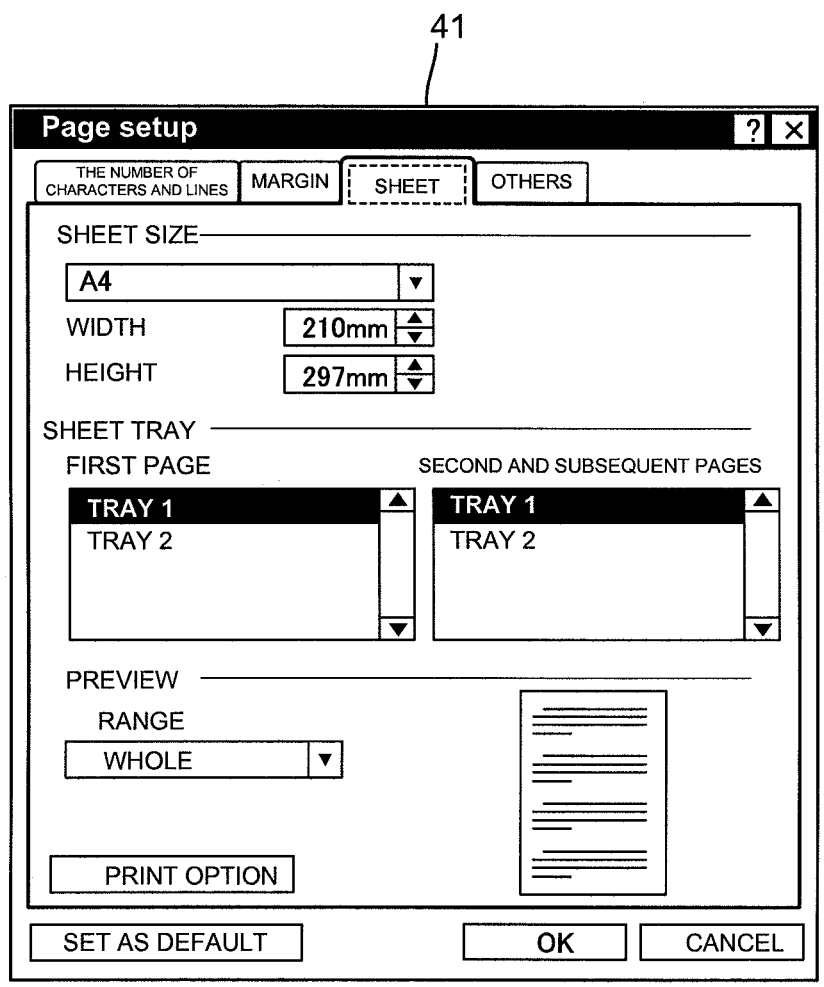
FIG. 3 schematically depicts an example of a page setup screen.

FIG. 3 schematically depicts an example of a page setup screen 41 displayed by the application 16. The page setup screen 41 may be configured to receive another input operation (e.g., from a user) that sets the setting values for a portion of the setting items, such as the sheet size and the sheet tray, in the application 16. The screen name may be labeled as: "page setup screen," "print setup screen," or another screen name depending on the application 16.

The application 16 may be configured to receive a page setup display instruction (e.g., from a user) that instructs the application 16 to display the page setup screen 41.

In response to the page setup display instruction, the application 16 may request, from the printer driver 17, an initial address of a structure called a DEVMODE structure (e.g., the setup condition), which may be used to transfer the print condition between the application 16 and the printer driver 17.

It may be sufficient for the application 16 to request the initial address of the DEVMODE structure before the application 16 issues a print instruction to the printer driver 17. In the present embodiment, the DEVMODE structure used to transfer the print condition is called a transfer DEVMODE structure to discriminate between the transfer DEVMODE structure and a printing DEVMODE structure which is different from the transfer DEVMODE structure.

In response to the request from the application 16 for the initial address of the transfer DEVMODE structure, the printer driver 17 prepares the transfer DEVMODE structure on the RAM 13 and sets a default setting in the prepared transfer DEVMODE structure. The printer driver 17 then returns the initial address of the transfer DEVMODE structure to the application 16. The application 16 may request a list of setting values from the printer driver 17, which may be set for each of the setting items to be set by the other input operation and may display the list of setting values resulting from the inquiry on the page setup screen 41 as selectable options.

FIG. 4 is a table schematically depicting an example of the list of setting values for the sheet size, returned from the printer driver 17 to the application 16. Values that may be set for the sheet name in FIG. 4 comprise, but are not limited to, A4, Letter, and A5.

The printer driver 17 may return information about each value that may be set and information about each preset print setting as the list of setting values.

The information about each value that may be set may comprise, but is not limited to, three information items: a sheet ID, a sheet name, and a sheet size. The sheet ID may be an identifier uniquely given to the sheet of each size. The sheet name may be a name of the sheet having the size corresponding to the sheet ID. The sheet size may indicate the vertical and horizontal lengths (e.g., lengths in mm) of the sheet corresponding to the sheet ID. The printer driver 17 may also return information about each preset print setting that is registered as part of the list of setting values, in addition to the "information about each value that may be set."

The information about each preset print setting includes a preset print setting ID, a preset print setting name, and the vertical and horizontal lengths of the sheet size set in the preset print setting. The preset print setting ID is given so as not to coincide with the sheet ID. In the case of the information about each preset print setting, the above values are the elements of each of the information items (i.e., the sheet ID, the sheet name, and the sheet size) described above.

Nevertheless, the printer driver 17 does not return the information about the preset print setting for all the preset print settings that are registered to the application 16, but returns only information about preset print settings that are listed under a certain condition to the application 16. The listing are described in detail below.

Figure 5:
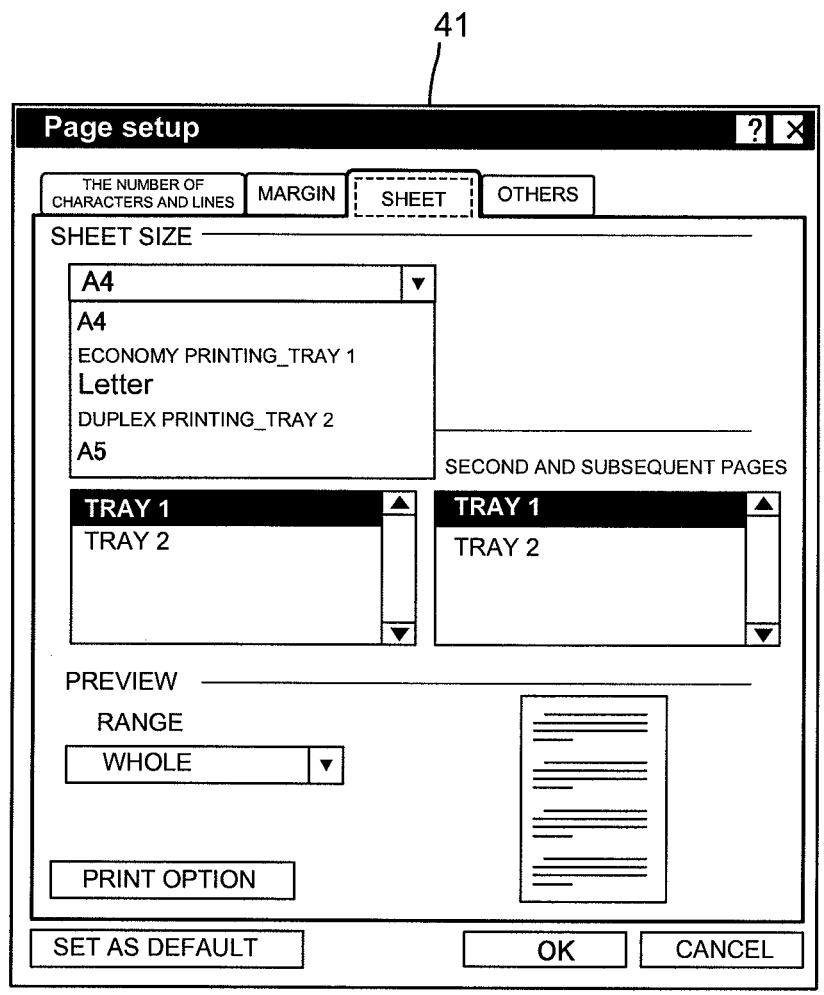
FIG. 5 schematically depicts an example of the page setup screen of FIG. 3 when a list of setting values is displayed.

FIG. 5 schematically depicts an example of the page setup screen 41 when the list of setting values for the sheet size, returned from the printer driver 17, is displayed as the options. Because the printer driver 17 returns also the information about each preset print setting as part of the list of setting values, the information about each preset print setting also is displayed as an option, in addition to the information about each value (specifically, the sheet name in the information about each value), as depicted in the example in FIG. 5. Specifically, the preset print setting name in the information about each preset print setting.

Because the preset print setting name of each preset print setting is displayed as an option when the printer driver 17 is used, the user may specify the preset print setting name of the preset print setting as a setting value. Accordingly, the user may specify the preset print setting on the page setup screen 41.

In response to the specification of the setting value for a setting item on the page setup screen 41 by the user, the application 16 overwrites the setting value set for the setting item of the transfer DEVMODE structure with the setting value (e.g., the sheet ID or the preset print setting ID) specified by the user. As a result, the setting value specified by the user is set in the print condition (e.g., a setting process).

Accordingly, when the preset print setting name is specified as the setting value of the sheet size, the preset print setting ID corresponding to the preset print setting name is set in the print condition as the setting value of the sheet size.

It is sufficient for the application 16 to set the setting value in the DEVMODE structure before the application 16 issues the print instruction to the printer driver 17.

The setting values may be set also for the sheet tray in the application 16 in the example depicted in FIG. 3. In this case, if the information about each preset print setting is returned also in response to an inquiry for the list of setting values for the sheet tray, there may be a possibility that the user specifies the preset print setting ID set for the sheet size different from the preset print setting ID set for the sheet tray.

In order to resolve the above problem, when the printer driver 17 receives inquiries for the setting values of multiple setting items from the application 16, the printer driver 17 may return the information about the preset print setting in response to one inquiry, among the multiple inquiries.

In the present embodiment, the information about the preset print setting may be returned in response to an inquiry for the list of setting values for the sheet size (e.g., a first setting item), and the information about the value that may be set may be returned and the information about the preset print setting may not be returned in response to an inquiry for the list of setting values for the sheet tray (e.g., a second setting item). This may prevent the preset print setting ID set for the sheet size from being different from the preset print setting ID set for the sheet tray.

The information about the preset print setting may be returned in response to an inquiry for the sheet tray and the information about the preset print setting may not be returned in response to an inquiry for the sheet size.

(5) Dedicated Printer Driver and Universal Printer Driver

The printer driver 17 may be a dedicated printer driver that has been exclusively developed for one type of printers or a general-purpose printer driver (universal printer driver) capable of controlling multiple types of printers.

When the printer driver 17 is a dedicated printer driver, the "information about each value that may be set" may be hard-coded into the printer driver 17 itself. In contrast, when the printer driver 17 is a universal printer driver, the values that may be set for each setting item may vary with the type of the printer 2. Accordingly, the printer driver 17 may acquire a collection of values that may be set for each setting item from the printer 2 specified by the user, may generate the "information about each value that may be set" from the acquired collection of values, and may return the generated information about each value that may be set to the application 16.

Specifically, in response to the user's selection of [Print] on the menu displayed by the application 16, a print screen (not depicted) may be displayed by the application 16 and the user may specify a printer on this print screen.

Because the universal printer driver may not be a printer driver that may support a specific type of printer, the user may directly specify the universal printer driver on the print screen instead of a printer when the user desires to use the universal printer driver.

In response to specification of the universal printer driver and clicking of a certain button on the print screen, the universal printer driver may be invoked from the application 16. The invoked universal printer driver may display a screen on which the user may specify a printer and a collection of values that may be set for each setting item is acquired from the printer set on the screen. Then, the universal printer driver may generate the "information about each value that may be set" on the basis of the acquired collection of values.

Frequently, users may specify the printer 2 or the universal printer driver before an instruction to display the page setup screen 41 and that, when the user specifies the universal printer driver, the collection of values that may be set for each setting item has already been acquired from the printer 2 specified by the user.

When the printer 2 is specified on the print screen, the application 16 inquires of the dedicated printer driver corresponding to the specified printer 2 for a list of setting values and that, when the universal printer driver is directly specified, the application 16 inquires of the specified universal printer driver for a list of setting values.

(6) Inquiry for List of Setting Values that may be Set

The inquiry for a list of setting values for the sheet size, sent from the application 16 to the printer driver 17, will now be described in detail.

Figure 6:
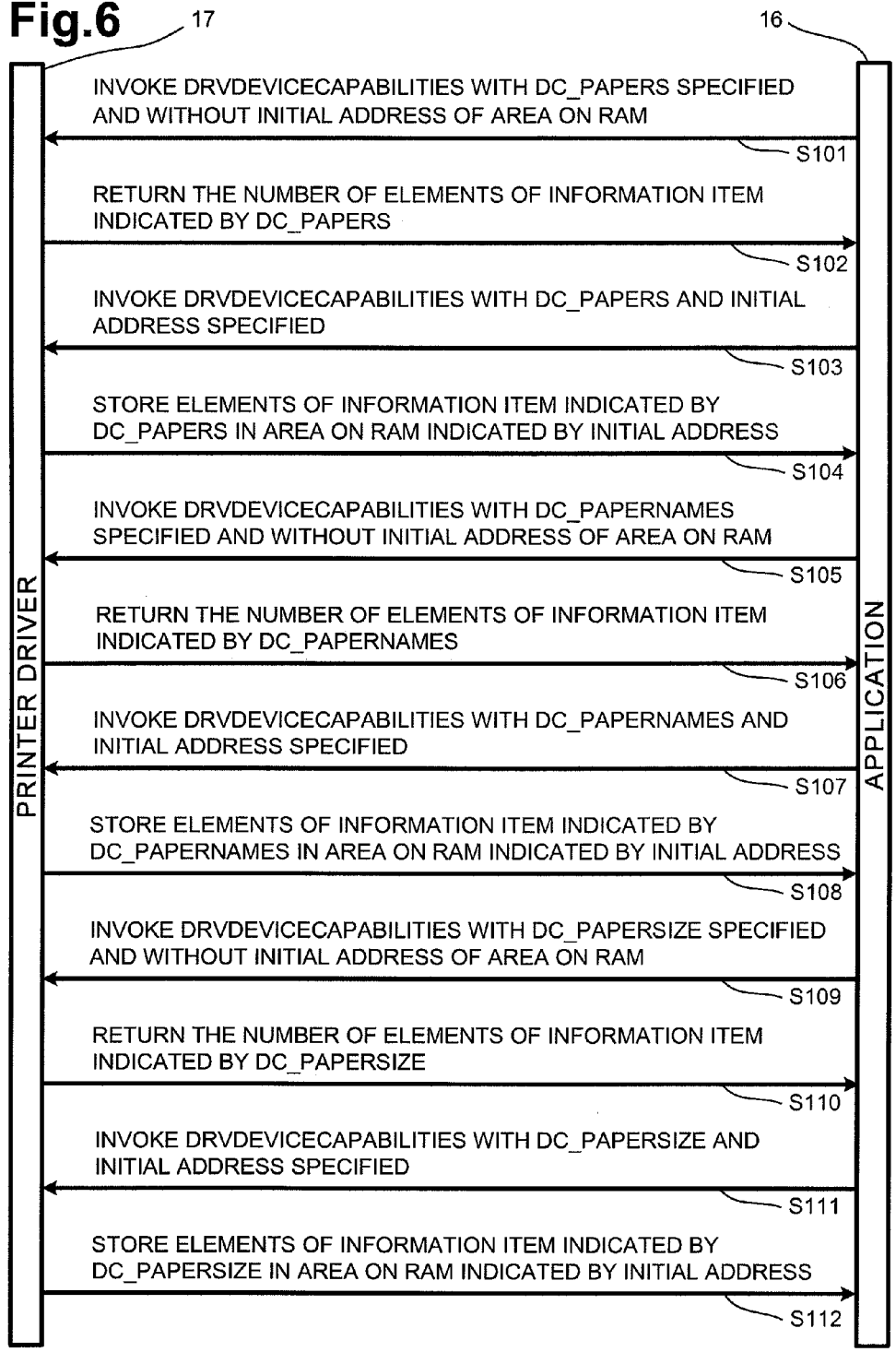
FIG. 6 is a sequence chart depicting an exemplary flow chart of an inquiry for a list of setting values.

FIG. 6 is a sequence chart depicting an exemplary flow of an inquiry for a list of setting values that may be set for the sheet size. This inquiry may be performed by invoking an Application Program Interface (API) called DrvDeviceCapabilities provided by the printer driver 17.

Generally, application 16 may invoke the DrvDeviceCapabilities for simplicity. However, practically, the application 16 may invoke an API called DeviceCapabilities provided by the OS. In response to the invocation of DeviceCapabilities, the OS may invoke the DrvDeviceCapabilities provided by the printer driver 17.

In the inquiry for a list of setting values, the DrvDeviceCapabilities may be invoked twice from the application 16 for each of the information items (the sheet ID, the sheet name, and the sheet size) described above.

At least a character string indicating the information item and the initial address of an area on the RAM 13 where the elements of the information item indicated by the character string are stored may be specified in the DrvDeviceCapabilities as arguments. The character string may be DC_PAPERS in the case of the sheet ID, may be DC_PAPERNAMES in the case of the sheet name, and may be DC_PAPERSIZE in the case of the sheet size. The elements of the information item may be 9, 1, 11, 1001, and 1004 in the case of DC_PAPERS.

Referring to FIG. 6, in Step S101, the CPU 11 executing the application 16 may invoke the DrvDeviceCapabilities by specifying the character string "DC_PAPERS," which indicates the sheet ID corresponding to the information item, and without the initial address of the area on the RAM 13 (e.g., an inquiring process and an accepting process).

In Step S102, the CPU 11 executing the printer driver 17 (hereinafter simply referred to as the "printer driver 17") may return the number of elements (five in the example in FIG. 4) of the information item (e.g., the sheet ID) indicated by DC_PAPERS to the application 16 as a return value of the DrvDeviceCapabilities (e.g., a returning process).

In Step S103, the application 16 may prepare an area where the elements of the number returned in Step S102 may be stored on the RAM 13 and may invoke the DrvDeviceCapabilities specifying "DC_PAPERS" and the initial address of the area prepared on the RAM 13 (e.g., the inquiring process and the accepting process).

In Step S104, the printer driver 17 may store the elements (9, 1, 11, 1001, and 1004) of the information item (the sheet ID) indicated by DC_PAPERS in the area on the RAM 13 indicated by the initial address passed as the argument (e.g., the returning process).

The processing in Steps S105 to S112 are substantially the same as the processing in Steps S101 to S104 described above except that Steps S105 to S112 may involve different information items. Accordingly, a description of the processing in Steps S105 to S112 is omitted herein.

(7) Process Performed by Printer Driver

Figure 7:
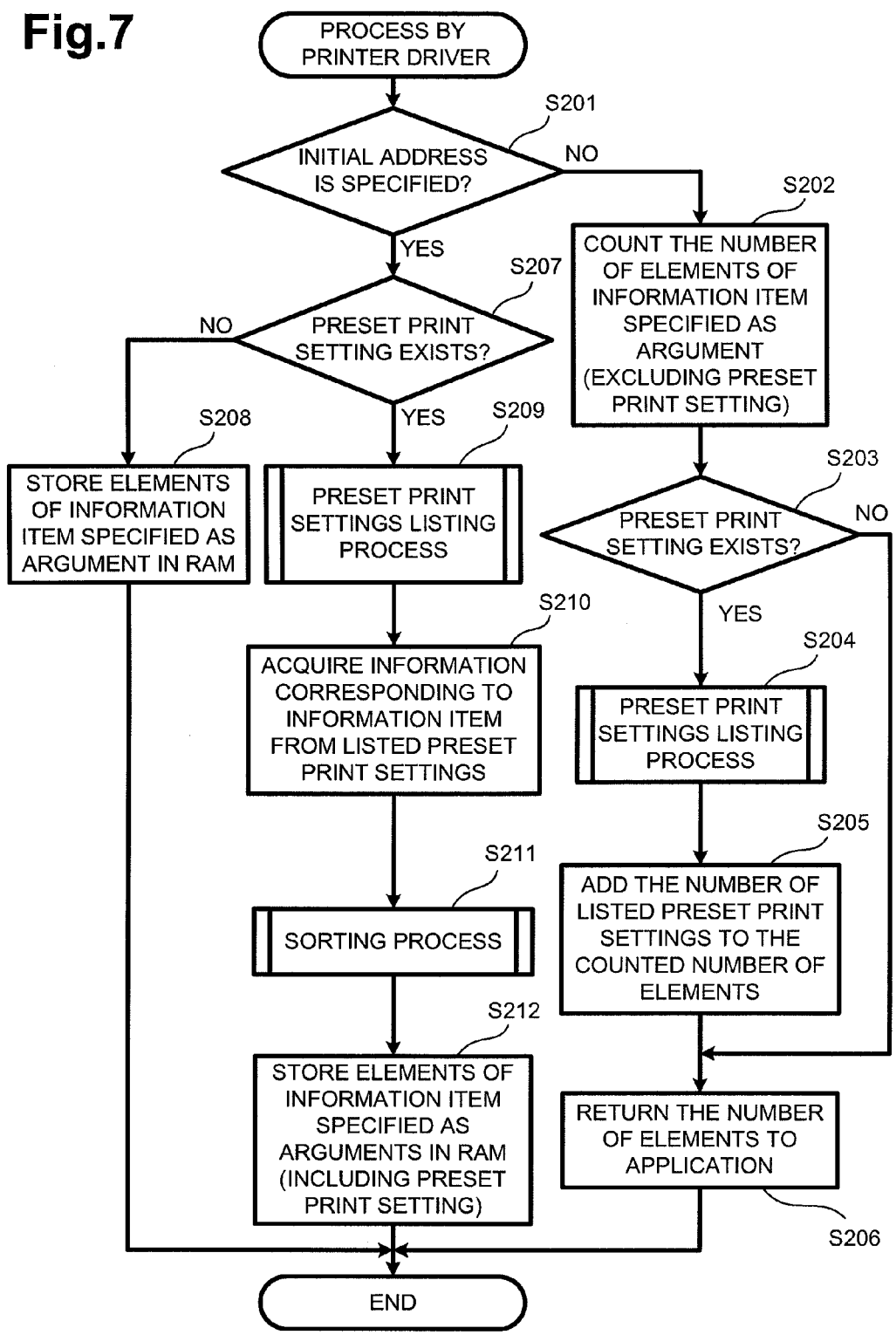
FIG. 7 is a flowchart depicting an example of a process performed by the printer driver.

FIG. 7 is a flowchart depicting an example of a process performed by the printer driver 17 when the DrvDeviceCapabilities is invoked.

Referring to FIG. 7, in Step S201, the printer driver 17 may determine whether the initial address is specified as the argument. If the initial address is not specified (in the case of a first invocation of each information item), the process may go to Step S202. If the initial address is specified (in the case of a second invocation of each information item), the process may go to Step S207.

In Step S202, the printer driver 17 may count the number of elements (excluding the preset print settings) of the information item specified as the argument. For example, because DC_PAPERS has elements 9, 1, and 11, the number of elements is three. DC_PAPERNAMES and DC_PAPERSIZE also may each have three elements.

In Step S203, the printer driver 17 may determine whether the preset print setting exists (is registered). If the preset print setting exists, the process may go to Step S204. If the preset print setting does not exist, the process may go to Step S206.

In Step S204, the printer driver 17 may execute a preset print settings listing process to list the preset print settings for which setting values that may not be set in the printer 2 are not set. The preset print settings listing process is described below. "Economy printing_Tray 1" and "Duplex printing_Tray 2" may be listed in the preset print settings listing process.

In Step S205, the printer driver 17 may add the number (two) of preset print settings listed in Step S204 to the number (three) of elements counted in Step S202 to determine the number (five) of elements to be returned to the application 16.

In Step S206, the printer driver 17 may return the number of elements determined in Step S205 to the application 16 as a return value to the DrvDeviceCapabilities.

In Step S207, the printer driver 17 may determine whether the preset print setting is registered (e.g., exists). If the preset print setting is not registered, the process may go to Step S208. If the preset print setting is registered, the process may go to Step S209.

In Step S208, the printer driver 17 may acquire the elements (e.g., 9, 1, and 11 in the case of DC_PAPERS) of the information item specified as the argument from the "information about each value that may be set."

Then, the printer driver 17 may store the acquired elements in an area on the RAM 13 indicated by the initial address passed as the argument.

In Step S209, the printer driver 17 may execute the "preset print settings listing process" described above.

In Step S210, the printer driver 17 may acquire information corresponding to the information item indicated by the character string specified as the argument from the listed preset print settings.

For example, when DC_PAPERS (i.e., the sheet ID) is specified as the argument, the printer driver 17 may acquire the ID (1001 or 1004) of each of the listed preset print settings as the "information corresponding to the information item."

When DC_PAPERNAMES (i.e., the sheet name) is specified as the argument, the printer driver 17 may acquire a collection of preset print setting names as the "information corresponding to the information item." When DC_PAPER-SIZE (i.e., the sheet size) is specified as the argument, the printer driver 17 may acquire a collection of vertical (e.g., longitudinal) and horizontal (e.g., latitudinal) lengths of the sheet size set in each preset print setting as the "information corresponding to the information item."

In Step S211, the printer driver 17 may acquire the elements (e.g., 9, 1, and 11 in the case of DC_PAPERS) of the information item specified as the argument from the "information about each value that may be set."

Then, the printer driver 17 may execute a "sorting process" to sort the acquired elements (e.g., 9, 1, and 11) and the "information corresponding to the information item" generated in Step S210 (e.g., 1001 and 1004 in the case of DC_PAPERS). The "sorting process" is described in detail below.

In Step S212, the printer driver 17 may store the elements (e.g., 9, 1, and 11) acquired in Step S211 and the "information corresponding to the information item" (e.g., 1001 and 1004) in the order sorted in Step S211 in the area on the RAM 13 indicated by the initial address passed as the argument.

(7-1) Preset Print Settings Listing Process

Figure 8:
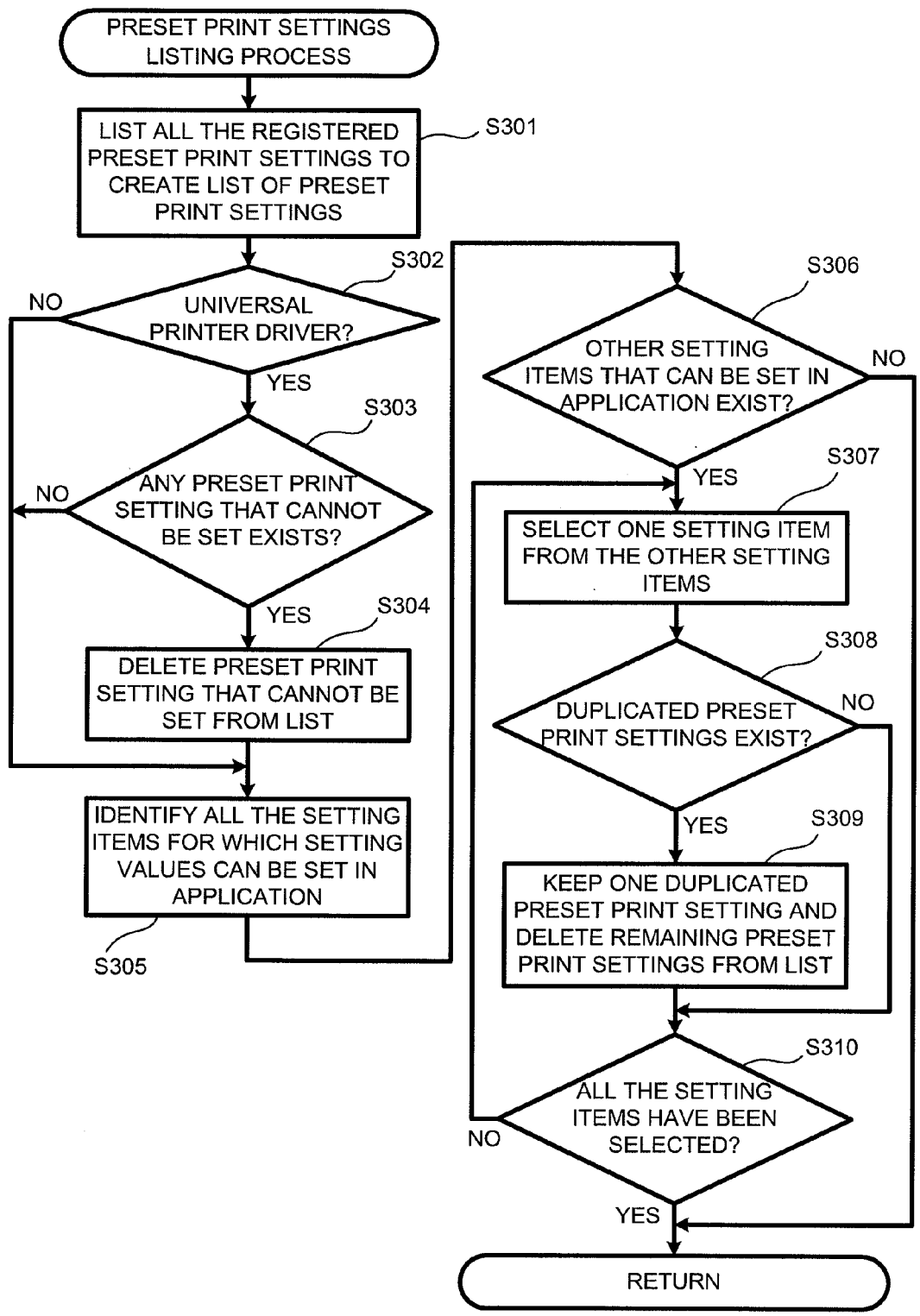
FIG. 8 is a flowchart depicting an example of a preset print settings listing process.

FIG. 8 is a flowchart depicting an example of the preset print settings listing process.

Referring to FIG. 8, in Step S301, the printer driver 17 may list all the preset print settings that are registered to create a list of preset print settings.

In Step S302, the printer driver 17 may determine whether the printer driver 17 is a universal printer driver. If the printer driver 17 is a universal printer driver, the process may go to Step S303. If the printer driver 17 is not a universal printer driver, the process may go to Step S305.

In Step S303, the printer driver 17 may determine whether the setting value set for each setting item of each of the listed preset print settings is included in the collection of values acquired from the printer 2 specified by the user (the collection of values that may be set for the setting item). In other words, the printer driver 17 may determine whether the setting value is supported by the user-specified printer.

If a preset print setting having at least one setting value which is not included in the collection of values (e.g., if any preset print setting may not be set) exists, the process may go to Step S304. If the preset print setting that may not be set does not exist, the process may go to Step S305.

In Step S304, the printer driver 17 may delete the preset print setting that may not be set from the list of the preset print settings created in Step S301. As a result, application 16 may not receive information about preset print settings having setting values which the printer 2 does not support.

In Step S305, the printer driver 17 may identify the setting items for which the setting values may be set in the application 16. For example, because the sheet size and the sheet tray may be the setting items for which the setting values may be set in the application 16 in the example of FIG. 3, the sheet size and the sheet tray may be identified.

The identification may be performed by various methods. For example, if an application A may set the sheet size and the sheet tray, information indicating that the application A may set the sheet size and the sheet tray may be registered in the printer driver 17 in advance. If application A is the application 16 inquiring for a list of setting values, the printer driver 17 may identify the sheet size and the sheet tray as the setting items for which the setting values may be set in the application 16.

Alternatively, in response to an inquiry for a list of setting values from the application 16 for the first time, all the setting items for which the list of setting values are inquired for from the application 16 may be stored in the storage unit 14 and a setting item may be subsequently read out from the storage unit 14 to identify the setting item. However, in this case, it is may not be possible to identify all the setting items that may be set in response to an inquiry from the application 16 for the first time.

In Step S306, the printer driver 17 may determine whether other setting items that may be set in the application 16 exist, in addition to the setting item that is being inquired for.

For example, if the setting item that is being inquired for is the sheet size exemplified in FIG. 3, the determination in Step S306 may be affirmative because the sheet tray may be set in addition to the sheet size.

If other setting items that may be set in the application 16 exist, the process may go to Step S307. If other setting items that may be set in the application 16 do not exist, the preset print settings listing process may terminate and the printer driver 17 may go back to the process in FIG. 7.

In Step S307, the printer driver 17 may select one setting item (e.g., the sheet tray in the above example) from the other setting items that may be set in the application 16, in addition to the setting item that is being inquired for.

In Step S308, the printer driver 17 may determine whether duplicated preset print settings exist in the list of the preset print settings. The printer driver 17 may determine whether two or more preset print settings exist in the list of the preset print settings that differ from each other in the setting value for the setting item (e.g., the sheet tray) selected in Step S307 and that have the same setting values for the other setting items.

For example, in the example of FIG. 2, Economy printing_Tray 1 and Economy printing_Tray 2 may differ from each other in the setting value set in the selected setting item (e.g., the sheet tray) and may have the same setting values for the other setting items comprising the setting item (e.g., the sheet size) that is being inquired for. Accordingly, the determination in Step S308 may be affirmative.

Because Duplex printing_Tray 1 and Duplex printing_Tray 2 differ from each other in the setting value for the sheet tray (the selected setting item) and have the same setting values for the other setting items including the sheet size (e.g., the setting item that is being inquired for) in the example of FIG. 2, the determination in Step S308 may also be affirmative in this case.

If the determination in Step S308 is affirmative, the process may go to Step S309. If the determination in Step S308 is negative, the process may go to Step S310.

In Step S309, the printer driver 17 may keep one of the duplicated preset print settings and may delete the remaining preset print settings from the list of the preset print settings.

For example, Economy printing_Tray 1 and Duplex printing_Tray 2 may be kept, and Economy printing_Tray 2 and Duplex printing_Tray 1 may be deleted from the list.

In Step S310, the printer driver 17 may determine whether any setting item that has not been selected exists, among the other setting items that may be set in the application 16, in addition to the setting item (e.g., the sheet size) that is being inquired for. If the determination in Step S310 is affirmative (e.g., all the setting items have not been selected), the process may go back to Step S307 to repeat the steps until all the setting items are selected. If the determination in Step S310 is negative (e.g., all the setting items have been selected), the preset print settings listing process may terminate and the printer driver 17 may return to the process in FIG. 7.

The preset print settings to be returned to the application 16 may be listed in the above manner.

(7-2) Sorting Process

Figure 9:
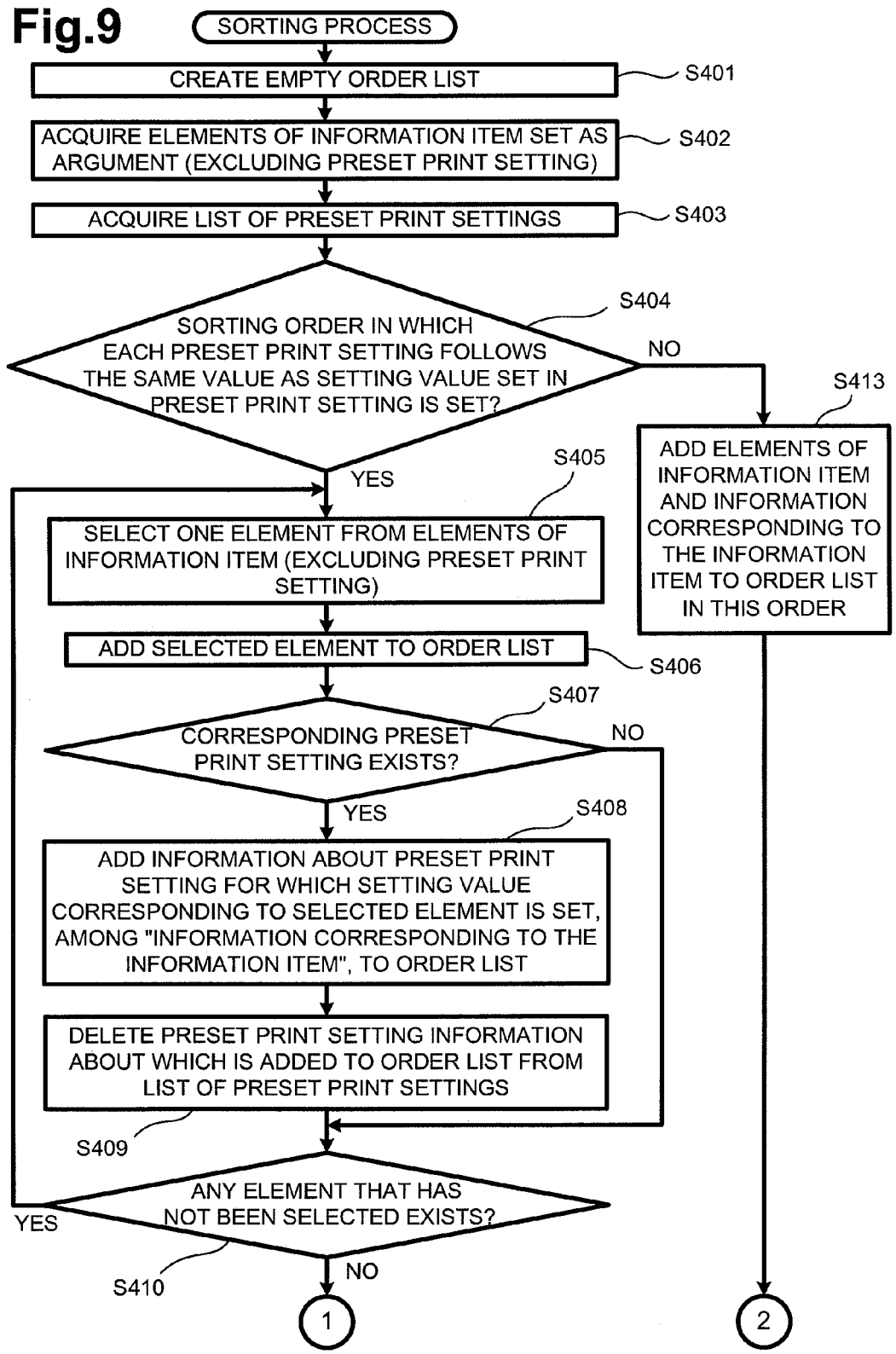
FIG. 9 is a flowchart depicting an example of a sorting process.
Figure 10:
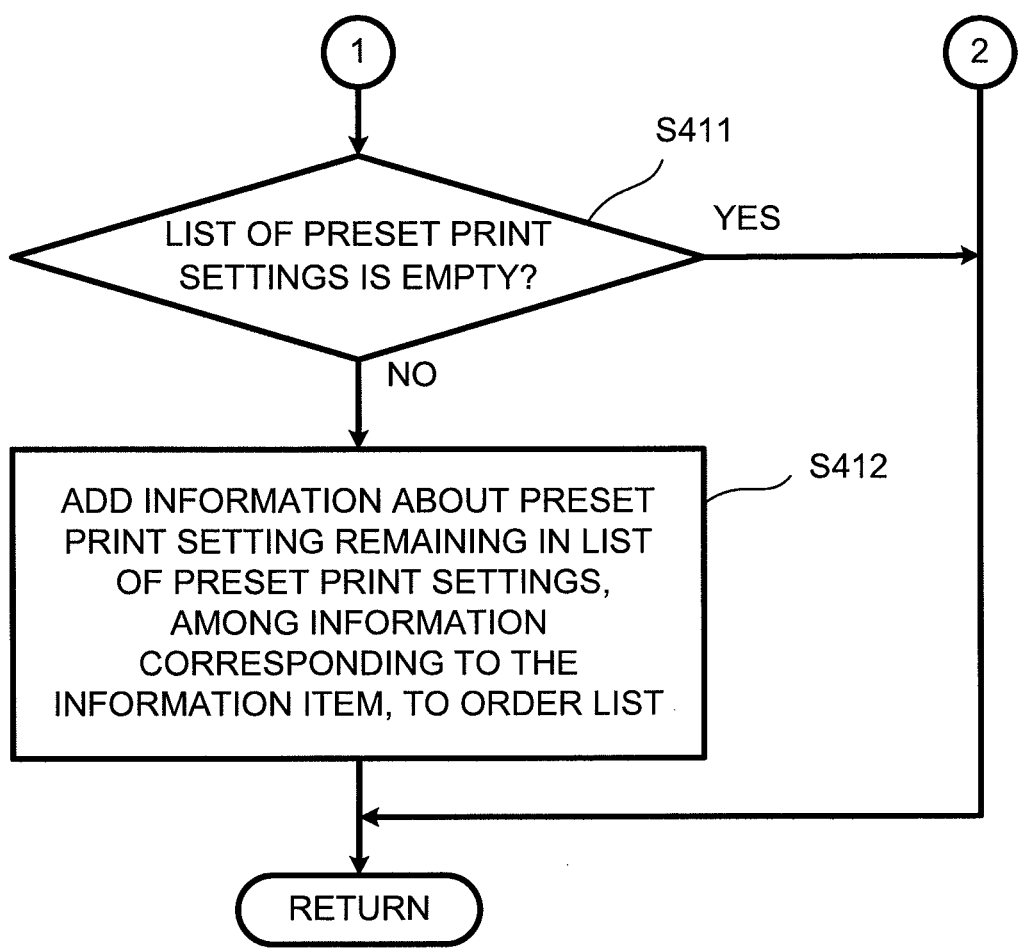
FIG. 10 is another flowchart depicting the example of the sorting process.

FIG. 9 and FIG. 10 are flowcharts depicting an example of the sorting process.

Figure 11:
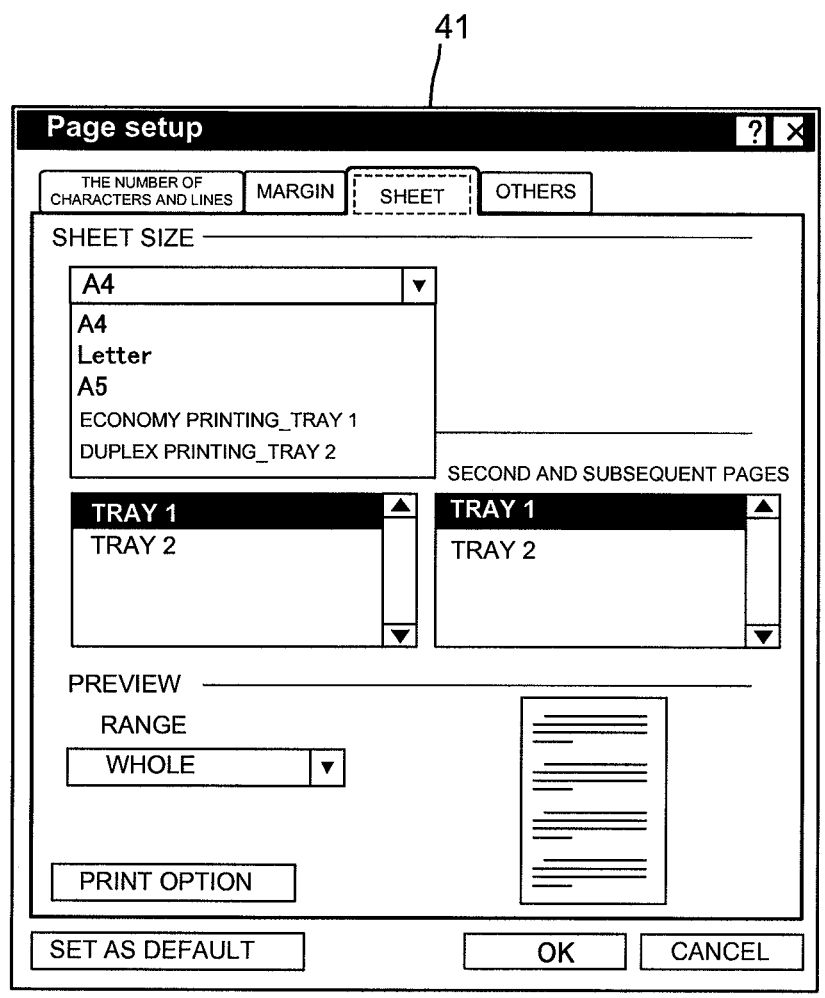
FIG. 11 schematically depicts an example of the page setup screen when a list of setting values is displayed.

A sorting order in which each preset print setting may follow the same value as the setting value set for the preset print setting (i.e., Order A, as exemplified in FIG. 5) and an order in which the preset print settings may follow a collection of values (i.e., Order B, as exemplified in FIG. 11).

As described above, Order A may correspond to the sorting order exemplified in FIG. 5. For example, because A4 may be set as the sheet size in "Economy printing_Tray 1," "Economy printing_Tray 1" may follow "A4."

As described above, Order B may correspond to a sorting order depicted in FIG. 11 in which the information items about the values that may be set may be first arranged and, then, the information items about the preset print settings may be arranged.

The sorting order, among the two sorting orders, in which the elements are arranged may be set in advance. This setting may be performed on the print condition setup screen displayed by the printer driver 17.

A case in which DC_PAPERS (e.g., the sheet ID) is specified as the argument in the sorting process is exemplified here.

Referring to FIG. 9, in Step S401, the printer driver 17 may create an empty order list.

In Step S402, the printer driver 17 may acquire the elements 9, 1, and 11 of the information item indicated by the character string DC_PAPERS, when DC_PAPERS is specified as the argument from the "information about each value that may be set."

In Step S403, the printer driver 17 may acquire the list of the preset print settings listed in the "preset print settings listing process" in Step S209.

In Step S404, the printer driver 17 determines whether the sorting order is set to Order A. If the sorting order is set to Order A, the process may go to Step S405. If the sorting order is not set to Order A (e.g., the sorting order is set to Order B), the process may go to Step S413.

In Step S405, the printer driver 17 may select one element from the elements 9, 1, and 11 of the information item acquired in Step S402. The elements may be selected such that the corresponding sheet sizes are arranged in the same order for all the information items.

In Step S406, the printer driver 17 may add the selected element to the order list.

In Step S407, the printer driver 17 may determine whether the preset print setting for which the sheet size corresponding to the element selected in Step S405 is set exists in the list of the preset print settings.

For example, when the element selected in Step S405 is "11," the determination in Step S407 may be negative because the sheet size corresponding to the element is A5 and no preset print setting for which A5 is set exists in the list of the preset print settings. When the element selected in Step S405 is "9," the determination in Step S407 may be affirmative because the sheet size corresponding to the element is A4 and A4 is set as the sheet size in "Economy printing_Tray 1."

If the determination in Step S407 is affirmative, the process may go to Step S408. If the determination in Step S407 is negative, the process may go to Step S410.

In Step S408, the printer driver 17 may add the information about the preset print setting for which the setting value corresponding to the selected element is set, among the "information corresponding to the information item" acquired in Step S210, to the order list.

For example, in the case of the sheet ID, the "information corresponding to the information item" may comprise 1001 and 1004. When the selected element is "9," "1001," which is the information about the preset print setting for which the setting value corresponding to the selected element, is added to the order list because the setting value corresponding to the selected element is A4 and the preset print setting for which A4 is set is "Economy printing_Tray 1." Thus, because the preset print setting "1001" has the same sheet size as element "9," the preset print setting "1001" may be ordered below element "9."

In Step S409, the printer driver 17 may delete the preset print setting (e.g., Economy printing_Tray 1 in the above example) and may add the information about the preset print setting from the list of the preset print settings to the order list in Step S408.

In Step S410, the printer driver 17 may determine whether any element that has not been selected exists. If any element that has not been selected exists, the process may go back to Step S405 to repeat the steps until the selection of all the elements is completed. If no element that has not been selected exists, the process may go to Step S411 in FIG. 10.

In Step S411, the printer driver 17 may determine whether the list of the preset print settings is empty. If the list of the preset print settings is not empty, the process may go to Step S412. If the list of the preset print settings is empty, the sorting process may terminate and the printer driver 17 may go back to the process in FIG. 7.

A user may customize the sheet size and may create a scenario where the list of the preset print settings is not empty despite the fact that all the values that may be set (e.g., all the elements of the sheet ID excluding the preset print settings) have been selected. When the user customizes the sheet size and the customized sheet size is set in the preset print setting, the setting value corresponding to the selected element may not be set and, thus, the preset print setting may remain in the list of the preset print settings.

In Step S412 in FIG. 10, the printer driver 17 may add the information about the preset print setting remaining in the list of the preset print settings to the order list.

In Step S413 in FIG. 9, the printer driver 17 may add the elements 9, 1, and 11 of the information item indicated by the character string (e.g., DC_PAPERS) specified as the argument and the "information corresponding to the information item" (e.g., 1001 and 1004) generated in Step S210 to the order list in this order.

(8) Printing Process

Figure 12:
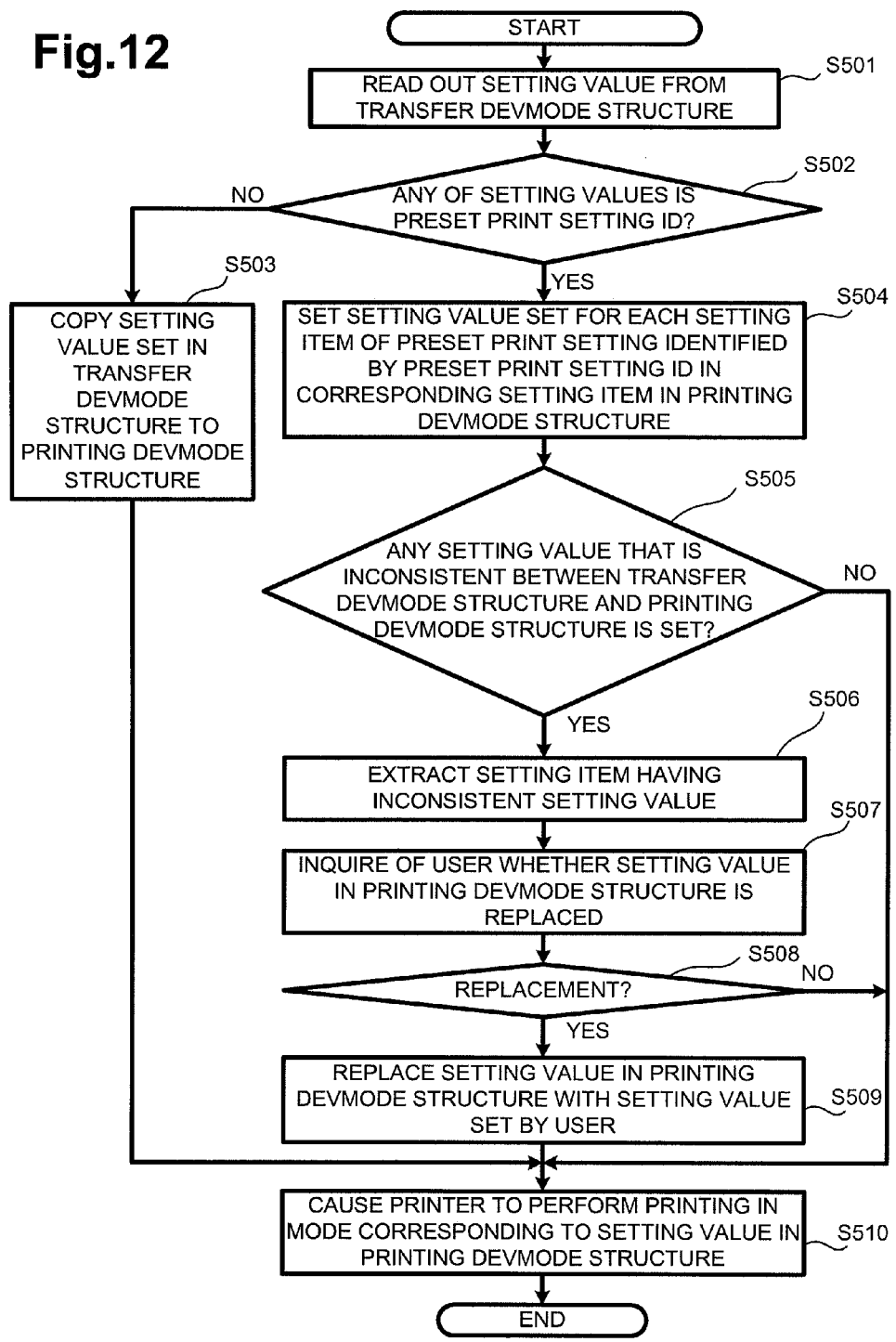
FIG. 12 is a flowchart depicting an example of a printing process.

FIG. 12 is a flowchart depicting an example of a printing process executed by the printer driver 17. In response to specification of [Print] in the menu displayed by the application 16 by the user, the application 16 may issue a printing instruction to the printer driver 17 through the OS 15 and the printer driver 17 may start the printing process upon reception of the printing instruction.

Referring to FIG. 12, in Step S501, the printer driver 17 may read out the setting values (e.g., the sheet ID, the preset print setting ID, and the like) for the respective setting items from the transfer DEVMODE structure.

In Step S502, the printer driver 17 may determine whether any of the setting values read out in Step S501 is a preset print setting ID. If none of the setting values is a preset print setting ID, the process may go to Step S503. If any of the setting values is a preset print setting ID, the process may go to Step S504.

In Step S503, the printer driver 17 may copy the setting value set in the transfer DEVMODE structure to the printing DEVMODE structure.

In Step S504, the printer driver 17 may set the setting value set for each setting item of the preset print setting identified by the preset print setting ID in the corresponding setting item in the printing DEVMODE structure.

In Step S505, the printer driver 17 may determine whether any setting value that is inconsistent between the transfer DEVMODE structure and the printing DEVMODE structure is set.

For example, the user may set "Economy printing_Tray 1" as the setting value for the sheet size on the page setup screen 41 while the user may set Tray 2 as the sheet tray on the page setup screen 41. In this case, the setting value (e.g., Tray 2) set in the transfer DEVMODE structure may be inconsistent with the setting value (e.g., Tray 1) set in the printing DEVMODE structure.

If any inconsistent setting value is set, the process may go to Step S506. If no inconsistent setting value is set, the process may go to Step S510.

In Step S506, the printer driver 17 may extract the setting item (e.g., the sheet tray in the above example) having the inconsistent setting value.

Figure 13:
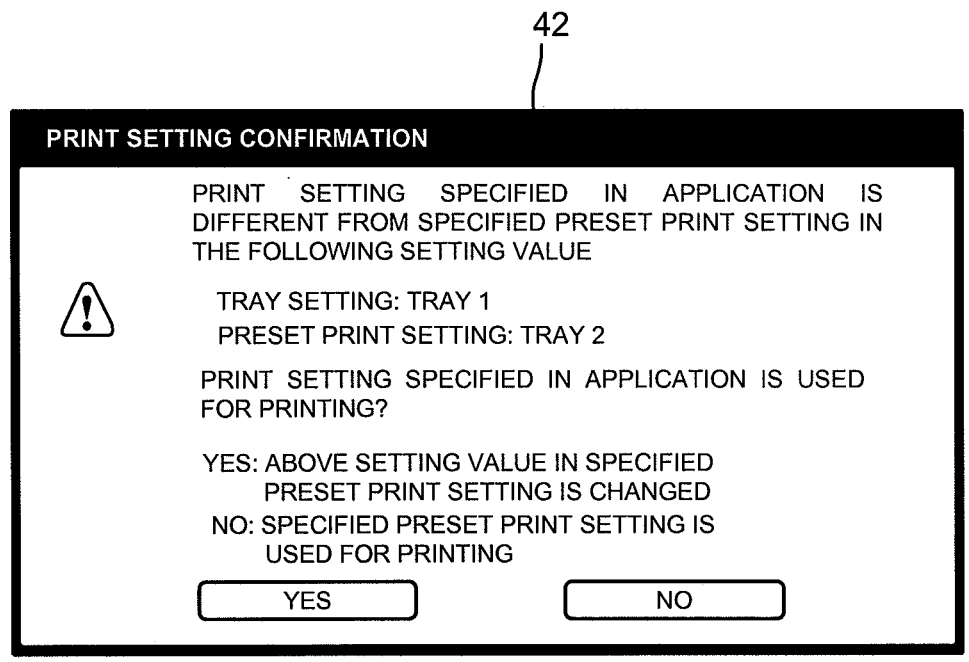
FIG. 13 schematically depicts an example of a print setting confirmation screen.

In Step S507, the printer driver 17 may display a print setting confirmation screen 42, as depicted in FIG. 13, in the display unit 21 to ask the user whether the setting value for the extracted setting item (e.g., the sheet tray), which is set in the printing DEVMODE structure, is replaced with the setting value set on the page setup screen 41.

In Step S508, the printer driver 17 may determine whether the user selects the "replacement." If the user selects the "replacement", the process may go to Step S509. If the user does not select the "replacement", the process may go to Step S510.

In Step S509, the printer driver 17 may replace the setting value that is set in the printing DEVMODE structure and that is set for the setting item (e.g., the sheet tray) extracted in Step S506 with the setting value set by the user on the page setup screen 41.

The setting value for the sheet tray may be replaced here. Accordingly, regardless of whether the user selects the "replacement," the setting value set in the preset print setting identified by the preset print setting ID may be used in the printing at least for the setting item (e.g., the sheet size) for which the preset print setting ID is set and the setting item (e.g., the number of colors, the image quality, the duplex printing, the number of print pages on a single side, and the like) for which the setting value is not set from the application 16.

In Step S510, the printer driver 17 may control the printer 2 on the basis of the setting value set in the printing DEVMODE structure to cause the printer 2 to perform the printing in a mode corresponding to the setting value set in the printing DEVMODE structure (e.g., a controlling process).

(9) Advantages of Embodiment

According to the embodiment described above, upon inquiry for a list of setting values that may be set for a setting item from the application 16, the printer driver 17 may return the information (e.g., information comprising a collection of values that may be set and the corresponding names) about the values that may be set for the setting item and the information (e.g., information comprising the preset print setting ID and the corresponding name) about the preset print setting to the application 16 as the list of setting values. Accordingly, the user may set the preset print setting from the application 16.

Consequently, it may not be necessary for the user to invoke the printer driver 17 to display the print condition setup screen each time the user attempts to specify the preset print setting. Thus, the features of this embodiment improve the user-friendliness of specifying of the preset print setting.

In addition, the printer driver 17 may not return the information about the preset print setting for which the setting value that is not included in the collection of values acquired from the specified printer 2 is set to the application 16.

When the printer driver 17 is a universal printer driver, the setting value that may be set for the same setting item may be varied depending on the printer 2. Accordingly, the printer 2 that does not support the setting values set in the preset print setting may exist.

The printer driver 17 may not return the information about the preset print setting, which has a setting value that is not comprised in the collection of values acquired from the specified printer 2, to the application 16 when the printer driver 17 is a universal printer driver. Consequently, it may be possible to prevent using a preset print setting having an unsupported setting value as the setting value.

Furthermore, upon inquiry for a list of setting values for each of at least two setting items from the application 16, the printer driver 17 may return the collection of values and the information about the preset print setting as the list of setting values for a first setting item (e.g., the sheet size), among the at least two setting items, and the printer driver 17 may return the collection of values and does not return the information about the preset print setting for a second setting item (e.g., the sheet tray), other than the first setting item among the at least two setting items.

If the information about the preset print settings is returned for multiple setting items, the preset print setting ID set for a setting item, among the multiple setting items, may be different from the preset print setting ID set for another setting item.

Because the printer driver 17 returns the information about the preset print setting for the first setting item, among the at least two setting items, and does not return the information about the preset print setting for the second setting item, it may be possible to prevent different preset print setting IDs from being set for multiple setting items.

Furthermore, the printer driver 17 may determine whether two or more preset print settings exist, which differ from each other in the setting value set for the second setting item and which have the same setting values for the other setting items comprising the first setting item. If such two or more preset print settings exist, the printer driver 17 may return the information about one of the two or more preset print settings to the application 16.

When two or more preset print settings exist, which differ from each other in the setting value set for the second setting item and which have the same setting values for the other setting items comprising the first setting item, it may be sufficient for the printer driver 17 to return the information about one of the two or more preset print settings to the application 16. When the information about one of the two or more preset print settings is set for the first item, one of the two or more preset print settings may be ultimately used because of the setting value for the second setting item. For example, when Economy printing_Tray 1 is selected and Tray 1 is set in the sheet tray on the page setup screen 41, Economy printing_Tray 1 may be ultimately used. When Economy printing_Tray 1 is selected and Tray 2 is set in the sheet tray on the page setup screen 41, the selection of the "replacement" in Step S507 by the user may cause Economy printing_Tray 2 to be ultimately used. Because the information about one of the two or more preset print settings is returned to the application 16, it may be possible to reduce the number of information items about the preset print settings included in the list of setting values, thereby facilitating the specification by the user.

Furthermore, when the setting value set for the second setting item (e.g., the sheet tray) of the preset print setting identified by the ID set in the print condition (e.g., the transfer DEVMODE structure) is different from the setting value set for the second setting item (e.g., the sheet tray) in the print condition (e.g., the transfer DEVMODE structure), the printer driver 17 may select either of the two setting values by a predetermined method (e.g., the selection by the user in the present embodiment) and the setting value selected by the user may be used. Accordingly, it is possible for the printer driver 17 to determine which setting value is used when the setting value set for the second setting item of the preset print setting identified by the ID set in the transfer DEVMODE structure is different from the setting value set for the second setting item in the transfer DEVMODE structure.

Furthermore, the printer driver 17 may arrange the values included in the collection of values that may be set (e.g., A4, Letter, and A4) and the "information corresponding to the information item" (e.g., Economy printing_Tray 1 and Duplex printing_Tray 2) generated for the preset print settings in a certain sorting order and may return the values and information arranged in the certain sorting order. Accordingly, setting the sorting order by which the user may easily specify the setting values as the certain sorting order may allow the user to more easily specify the setting values.

Furthermore, with the printer driver 17, the user may select the sorting order described above.

<Other Embodiments>

The present invention is not limited to the embodiments described above with reference to the drawings. For example, the technical scope of the present invention may comprise the following embodiments.

(1) Although the printer 2 is exemplified as the device in the embodiment described above, the device may not be limited to the printer 2. For example, the device may be a scanner, a facsimile, or a multifunction function peripheral having a print function, a scanning function, and so on.

(2) When the setting value set for the second setting item of the preset print setting identified by the ID set in the print condition (e.g., the transfer DEVMODE structure) is different from the setting value set for the second setting item in the print condition (e.g., the transfer DEVMODE structure), the user may select the setting value to be used from the two setting values in the first embodiment described above. However, the setting value to be used may be fixed.

(3) Although the embodiment of FIGS. 1-13 describes that the user may select the sorting order of the information about the values included in the collection of values and the information corresponding to the information item, the sorting order may be fixed in yet another embodiment.

(4) Although the user may set the setting value for the sheet tray even when the preset print setting name is set for the sheet size in the embodiment of FIGS. 1-13 described above, the option for the user to set the sheet tray may be unavailable when the preset print setting name is set for the sheet size.

(5) Alternatively, the setting value for the sheet tray may be selected only from the setting value set for the sheet tray in the preset print setting identified by the ID set for the sheet size and the setting value set for the sheet tray in the preset print setting that differs from the above preset print setting only in the setting value for the sheet tray.

While the invention has been described in connection with various example structures and illustrative embodiments, it will be understood by those skilled in the art that other variations and modifications of the structures and embodiments described above may be made without departing from the scope of the invention. Other structures and embodiments will be apparent to those skilled in the art from a consideration of the specification or practice of the invention disclosed herein. It is intended that the specification and the described examples are illustrative with the true scope of the invention being defined by the following claims.

What is claimed is:

1. A non-transitory, computer-readable medium storing a device control program comprising instructions for controlling a device based on setting values assigned to each of a plurality of setting items received from an application program, the instructions comprising the steps of:
   retrieving at least one setting value batch comprising data that specifies values for each setting item of the plurality of setting items, wherein each setting item of the plurality of setting items corresponds to an operation of the device;
   generating a list of values for a particular one of the plurality of setting items, the list of values comprising at least one setting value for the particular one of the plurality of setting items and the at least one setting value batch, each of the at least one setting value for the particular one of the plurality of setting items and the at least one setting value batch being selectable as a value for the particular one of the plurality of setting items;
   receiving a request for the list of values from the application program;
   upon receipt of the request, providing the list of values to the application program; and
   receiving a selection of one of the at least one setting value for the particular one of the plurality of setting items and the at least one setting value batch from the application program as the value for the particular one of the plurality of setting items.

2. The non-transitory, computer-readable medium according to claim 1, wherein the device control program is configured to control any one of a plurality of devices, the instructions further comprising the steps of:
   receiving an identification of one of the plurality of devices;
   receiving a collection of values for each setting item for the identified one of the plurality of devices; and
   determining whether any combination of values for each of the plurality of setting items from the collection of values corresponds to the at least one setting value batch.

3. The non-transitory, computer-readable medium according to claim 2, the instructions further comprising the step of:
   providing the at least one setting value batch which corresponds to the combination of values for each setting item of the plurality of setting items to the application program.

4. The non-transitory, computer-readable medium according to claim 1, the instructions further comprising the steps of:
   generating an other list of values for an other one of the plurality of setting items, the other list of values consisting of at least one setting value for the other one of the plurality of setting items, each of the at least one setting value for the other one of the plurality of setting items being selectable as a value for the other one of the plurality of setting items;
   receiving a request for the other list of values from the application program;
   providing the list of values and the other list of values to the application program.

5. The non-transitory, computer-readable medium according to claim 4, the instructions further comprising the steps of:
   determining whether the list of values comprises two or more setting value batches and whether the two or more setting value batches comprise different values for the other one of the plurality of setting items and the same value for the particular one of the plurality of setting items; and providing the list of values for the particular one of the plurality of setting items comprising any of the two or more setting value batches.

6. The non-transitory, computer-readable medium according to claim 4, the instructions further comprising the step of:

selecting, as a selected value for the other one of the plurality of setting items, one of a certain setting value and a batch value based on a predetermined method when:
  a particular one of the at least one setting value batch is selected for the particular one of the plurality of setting items,
  the certain setting value is selected for the other one of the plurality of setting items, and
  the certain setting value and the batch value are different, wherein the batch value is a specified value for the other one of the plurality of setting items specified by the data in the particular one of the at least one setting value batch, and wherein the predetermined method is selected from a group consisting of:
  selecting the certain setting value as the selected value for the other one of the plurality of setting items when selection of the certain setting value is confirmed,
  selecting the batch value as the selected value for the other one of the plurality of setting items when selection of the certain setting value is withdrawn,
  selecting the certain setting value as the selected value for the other one of the plurality of setting items, and
  selecting the batch value as the selected value for the other one of the plurality of setting items.

7. The non-transitory, computer-readable medium according to claim 6, the instructions further comprising the step of:

providing a notification that the certain setting value for the other one of the plurality of setting items and the batch value for the other one of the plurality of setting items are different.

8. The non-transitory, computer-readable medium according to claim 7, the instructions further comprising the step of:

requesting confirmation or withdrawal of selection of the certain setting value for the other one of the plurality of setting items.

9. The non-transitory, computer-readable medium according to claim 1, the instructions further comprising the steps of:

comparing each of the at least one setting value for the particular one of the plurality of setting items to a batch value for the particular one of the plurality of setting items to determine whether one of the at least one setting value for the particular one of the plurality of setting items and the batch value for the particular one of the plurality of setting items are the same, the batch value for the particular one of the plurality of setting items specified by data in the at least one setting value batch; and sorting the at least one setting value for the particular one of the plurality of setting items and the at least one setting value batch in the list of values, such that the at least one setting value batch follows the at least one setting value for the particular one of the plurality of setting items when the at least one setting value for the particular one of the plurality of setting items is the same as the batch value for the particular one of the plurality of setting items.

10. A method of controlling a device based on setting values assigned to each of a plurality of setting items received from an application program, the method comprising the steps of:

retrieving at least one setting value batch comprising values for each of the plurality of setting items, wherein each setting item of the plurality of setting items corresponds to an operation of the device;

generating a list of values for a particular one of the plurality of setting items, the list of values comprising at least one setting value for the particular one of the plurality of setting items and the at least one setting value batch, each of the at least one setting value for the particular one of the plurality of setting items and the at least one setting value batch being selectable as a value for the particular one of the plurality of setting items;

receiving a request for the list of values from the application program;

upon receipt of the request, providing the list of values to the application program; and receiving from the application program a selection of one of the at least one setting value for the particular one of the plurality of setting items and the at least one setting value batch as the value for the particular one of the plurality of setting items.

11. The method of controlling a device according to claim 10, wherein the device is any one of a plurality of devices, the method further comprising the steps of:

receiving an identification of the device;

receiving a collection of values for each setting item for the device; and determining whether any combination of values for each of the plurality of setting items from the collection of values corresponds to the at least one setting value batch.

12. A printer control device configured to control a printer based on setting values assigned to each of a plurality of setting items received from an application program, comprising:

a retrieving section configured to retrieve at least one setting value batch comprising values for each of the plurality of setting items, stored in a memory;

a generating section configured to generate a list of values for a particular one of the plurality of setting items, the list of values comprising at least one setting value for the particular one of the plurality of setting items and the at least one setting value batch, each of the at least one setting value for the particular one of the plurality of setting items and the at least one setting value batch being selectable as a value for the particular one of the plurality of setting items;

a receiver configured to receive a request for the list of values from the application program; and a transmitter configured to, upon receipt of the request, transmit the list of values to the application program, wherein the receiver is further configured to receive from the application program a selection of one of the at least one setting value for the particular one of the plurality of setting items and the at least one setting value batch as the value for the particular one of the plurality of setting items.

13. The printer control device according to claim 12, wherein the printer control device is configured to control any one of a plurality of printers, the printer control device further comprising:

a comparator, wherein the receiver is further configured to receive an identification of one of the plurality of printers;

wherein the receiver is further configured to receive a collection of values for each setting item for the identified one of the plurality of printers; and wherein the comparator is configured to determine whether any combination of values for each of the plurality of setting items from the collection of values corresponds to the at least one setting value batch.

14. The printer control device according to claim 13, wherein the transmitter is further configured to transmit the at least one setting value batch which corresponds to the combination of values for each setting item of the plurality of setting items to the application program.

15. The printer control device according to claim 12, wherein the generating section is configured to generate an other list of values for an other one of the plurality of setting items, the other list of values consisting of at least one setting value for the other one of the plurality of setting items, each of the at least one setting value for the other one of the plurality of setting items being selectable as a value for the other one of the plurality of setting items, wherein the receiver is configured to receive a request for the other list of values for from the application program, and wherein the transmitter is configured to transmit the list of values and the other list of values to the application program.

16. The printer control device according to claim 15, the printer control device further comprising:

a comparator configured to determine whether the list of values for the comprises two or more setting value batches and whether the two or more setting value batches comprise different values for the other one of the plurality of setting items and the same value for the particular one of the plurality of setting items, wherein the transmitter is further configured to transmit the list of values for the particular one of the plurality of setting items comprising any of the two or more setting value batches.

17. The printer control device according to claim 15, the printer control device further comprising:

a selector configured to select, as a selected value for the other one of the plurality of setting items, one of a certain setting value and a batch value when:

a particular one of the at least one setting value batch is selected for the particular one of the plurality of setting items, the certain setting value is selected for the other one of the plurality of setting items, and the certain setting value and the batch value are different, wherein the batch value is a specified value for the other one of the plurality of setting items specified by the data in the particular one of the at least one setting value batch.

18. The printer control device according to claim 17, wherein the transmitter is further configured to transmit a notification that the certain setting value for the other one of the plurality of setting items and the batch value for the other one of the plurality of setting items are different.

19. The printer control device according to claim 18, the printer control device further comprising:

a confirmation section configured to request confirmation or withdrawal of selection of the certain setting value for the other one of the plurality of setting items.

20. The printer control device according to claim 12, the printer control device further comprising:

a comparator configured to:

compare each of the at least one setting value for the particular one of the plurality of setting items to a batch value for the particular one of the plurality of setting items;

determine whether one of the at least one setting value for the particular one of the plurality of setting items and the batch value for the particular one of the plurality of setting items are the same, the batch value for the particular one of the plurality of setting items specified by data in the at least one setting value batch; and sort the at least one setting value for the particular one of the plurality of setting items and the at least one setting value batch in the list of values, such that the at least one setting value batch follows the at least one setting value for the particular one of the plurality of setting items when the at least one setting value for the particular one of the plurality of setting items is the same as the batch value for the particular one of the plurality of setting items.

* * * * *